United States Patent
Alonso

(10) Patent No.: US 6,553,654 B1
(45) Date of Patent: Apr. 29, 2003

(54) ARRANGEMENT FOR THE INSERTION OF COILS IN A STATOR

(75) Inventor: Jose Sarro Alonso, Castellar del Valles (ES)

(73) Assignee: Zanussi Elettromeccanica S.p.A., Pordenone (IT)

( * ) Notice: Subject to any disclaimer, the term of this patent is extended or adjusted under 35 U.S.C. 154(b) by 0 days.

(21) Appl. No.: 09/622,124

(22) PCT Filed: Sep. 3, 1999

(86) PCT No.: PCT/EP99/06500

§ 371 (c)(1),
(2), (4) Date: Aug. 14, 2000

(87) PCT Pub. No.: WO00/25411

PCT Pub. Date: May 4, 2000

(30) Foreign Application Priority Data

Oct. 23, 1998 (IT) ........................ PN980047 U

(51) Int. Cl.⁷ .................................. H02K 15/00
(52) U.S. Cl. .................. 29/732; 29/733; 29/736; 29/606
(58) Field of Search ................ 29/596, 597, 598, 29/732, 733, 734, 735, 736, 606, 605

(56) References Cited

U.S. PATENT DOCUMENTS

| | | | |
|---|---|---|---|
| 3,818,571 A | * 6/1974 | Arnold | 29/205 R |
| 4,449,293 A | * 5/1984 | Itoh | 29/736 |
| 4,658,492 A | * 4/1987 | Kieffer | 29/564.6 |
| 5,022,139 A | * 6/1991 | Jenson | 29/596 |
| 5,357,670 A | * 10/1994 | Taji | 29/734 |
| 5,826,321 A | * 10/1998 | Pease | 29/426.1 |

FOREIGN PATENT DOCUMENTS

WO    WO98/33261    * 7/1998

* cited by examiner

Primary Examiner—Peter Vo
Assistant Examiner—Alan M. Boswell
(74) Attorney, Agent, or Firm—Pearne & Gordon LLP

(57) ABSTRACT

Arrangement for the insertion of coils in a stator including a moving wire-insertion spider, a plurality of parallel wire-guide blades arranged along the contour of the moving spider, a stack-guide member provided with a plurality of recesses accommodating respective blades which are provided with a groove on their outer surface. The recesses are provided with a rib protruding towards the interior of the respective recess and extending parallel to the longitudinal direction thereof, and are adapted to engage respective grooves when the stack-guide member is inserted within the wire-guide blades. The grooves maybe arranged in pairs on a respective blade and are symmetrical with respect to a vertical plane passing through the axis of the moving spider.

7 Claims, 6 Drawing Sheets

ARRANGEMENT FOR THE INSERTION OF COILS IN A STATOR

The present invention refers to an improved arrangement for the insertion of the electric coils in the stator of an electric motor with the use of automatic equipment.

The stator in electric motors is commonly known to be made up substantially by two basic structures, ie. the stator stack and the various coils of electric wires that are appropriately inserted in the respective slots provided in said stator stack.

During stator manufacturing, use is made of automated machines along with assembly tools and processes which are specifically developed and designed for the insertion of the various coils of electric wires into the respective slots of the stator stack. Such a 'dedicated' equipment includes a tool which is generally known in the all as "coil insertion tool" and is formed by:

- a moving insertion spider provided with moving wire-guide blades,
- a container of stationary wire-guide blades,
- an insertion blade stack guide.

These terms are generally known to those skilled in the art; however, considering the the matter being dealt with here is a very specialistic one, in order to promote a better understanding of the following description the basic elements of the above cited tool shall be particularly stressed below by using the same terminology as the one used throughout the following description and the appended claims.

Moving Insertion Spider

This is a tool formed by a central rigid body, usually of metal and a substantially cylindrical shape, the side surface of which is provided with a plurality of recesses that are regularly spaced out from each other; these recesses have an elongated shape, are open on the side surface of said cylindrical body, and are arranged so as to enable their inner surface, which is in the form of a ruled surface, ie. a surface generated by the solely translatory, parallel motion of a straight line, to emerge, ie. come out at the bases of said cylindrical body.

In said recesses there are provided, in an alternate arrangement, a plurality of wire-guide blades, which are constituted by elongated members whose outer surface is again in the form of a ruled surface and whose respective axes are parallel to and equidistant from the axis of said cylindrical body.

Container of Stationary Wire-Guide Blades

This member is totally similar to the above described one, so that its description may be omitted here for reasons of conciseness. Anyway, the physical configuration of these two members, and the dimensions thereof, are such as to make it possible for the moving insertion spider to fit into said container of stationary wire-guide blades by simply introducing said moving spider, from the side of said cylindrical body, into the cylindrical space that is delimited externally by the barrier of the wire-guide blades arranged outside the cylindrical body of said container. This is usually possible owing to the fact that the blades arranged on the container and the blades arranged on the moving spider are provided alternately with respect to each other, so that the blades of the moving spider are able to fit into the recesses in the cylindrical body of the container of stationary wire-guide blades.

Blade Stack Guide

The blade stack guide is a cylindrical member formed by a rigid central body, usually of metal, whose side surface is provided with a plurality of recesses that are spaced out regularly from each other; these recesses have an elongated shape, are open on the side surface of said cylindrical body, and are arranged in such a manner as to enable their inner surface, which is in the form of a ruled surface, to emerge, ie. come out at the bases of said cylindrical body. In practice, this blade stack guide is fully similar to the cylindrical body that has been described in connection with both the moving spider and the stationary blade container.

For a more complete information, it should be further noticed here that the structure of the moving spider is sometimes inserted and firmly locked in the container of stationary blades, so that the latter has outwardly a structure that makes it substantially impossible for the two cylindrical bodies to be distinguished from each other. Such a variant, however, is not relevant to the purposes of the present invention, so that its description may be omitted here for reasons of greater clearness.

The procedure followed to assembly the coils in the stator is described shortly below:

- for a start, the moving spider is inserted to the desired depth into the container of stationary blades, whereas it will be appreciated that, in the case that these two members are already joined to each other, this phase is of course omitted; anyway, a corresponding plurality of parallel gaps extending in the lengthwise direction of the blades are created between the stationary blades and the contiguous moving blades;
- thereupon, the coils are appropriately inserted, in a basically per se known manner, into said gaps with the related wires that distribute up to a certain height, within and along said gaps;
- then the blade stack guide is mounted within the perimeter delimited, on the opposite side with respect to the cylindrical body, by the extreme portions of the same blades; this is obviously allowed for by the fact that the recesses in the blade stack guide are provided so as to be able to accomodate said extreme portions of the blades, so that the guiding function of such blades in the following phase is ensured;
- the coil insertion operation can at this point be started, which consists mainly in raising the moving spider and allowing the same to fit into the slots of the stator stack that will have in the meantime been duly prepared and arranged.

It is exactly during this operation that, owing to the effect of the various combined forces and reactions, the blades can be noticed to be stressed into flexing, both outwardly and inwardly, and even into twisting.

Since these blades are provided, on their outwards facing edges, with two sharp corners, that we shall call "slot lining protection borders" here and have the task of fitting in between the inlet edges of the sheath (also called "slot lining") used to protect the slot, it clearly ensues that even these protective borders undergo said flexural and/or torsional stresses, ie. in particular against the wires of the adjacent wire coils.

This occurrence gives usually rise to two kinds of drawbacks: the first one derives from said borders being subject to rapid wear-out owing to the wires of the coils rubbing against them along almost the entire length thereof; it therefore becomes necessary for these tools to be replaced quite frequently and this fact puts heavy penalties in terms of costs considering both the unit cost of these tools and the quite significant number in which they are necessarily used in such an industrial process on a very large scale as it is usually required today for a competitive production.

The second one of said drawbacks is due to the fact that said wires, by rubbing against said sharp corners of said edges, are exposed to being scratched or indented; in particular, it is their outer insulating enamel layer that is in this way most easily damaged, thereby making it easy for the coil to break down and causing adjacent damaged wires to short-circuit.

An arrangement for the insertion of coils in a stator stack wherein the blades are provided with grooves is known, for example, from U.S. Pat. No. 4,588,349 and JP 61 109442. However, the technical solutions described in these documents are only effective to avoid some problems related to the frictional contact between a coil and blades, and to provide an improved coil fitting system able of smoothly fitting coils in the slots in an armature core, but no improvement is offered to prevent the outward and inward bending stresses and torsional stresses of the wire-guide blades.

It would therefore be desirable, and it is actually a main purpose of the present invention, to provide one or more improved arrangements that are not only capable of preventing said wire-guide blades from undergoing both outward and inward bending stresses and torsional stresses as coils are being inserted in the related stator stack, but are also simple, unexpensive, capable of being implemented with readily available techniques and means, and do not require any modification to be introduced in the manufacturing process.

This aim is reached in the arrangements with the features as recited in the appended claims and described below by way of non-limiting example with reference to the accompanying drawings, in which:

In the course of the following description the terms "blade" and "lamina" are used as synonyms, according to the terminology that is currently used by those skilled in the art. The basic idea behind the present invention is described below.

Figure 1:
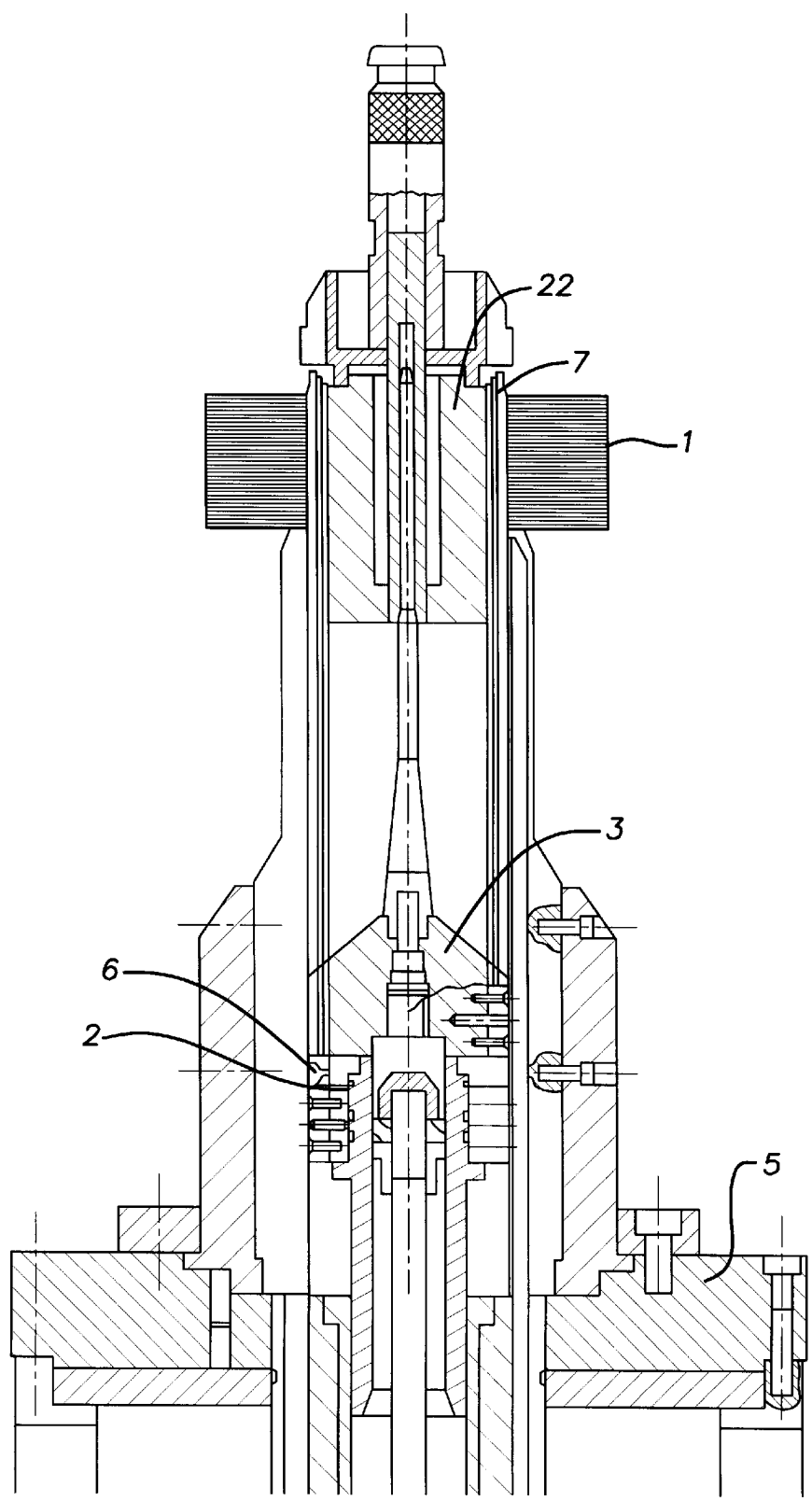
FIG. 1 is a median vertical-section view of a moving spider-blade container-blade stack guide-stator stack assembly during a coil insertion operation.

When reference is made to FIG. 1, the assembly illustrated there as, a cross-sectional view can be noticed to comprise following elements:
a) the stator stack 1,
b) the container 2 supporting the stationary wire-guide blades 6,
c) the moving insertion spider 3 with the related moving blades 7,
d) the blade stack guide comprising a central cylindrical body 22,
e) the arrangement support base 5.

Such an assembly may however not be provided with a moving insertion spider 3 and the related moving blades 7; in such a case, the insertion of the coils is obtained through the simple motion of said container 2 with the related stationary wire-guide blades 6, which therefore remain stationary with respect to their container, but become moving blades with respect to said stator stack 1.

In a generally known manner, at a certain point during the coil insertion process, the above cited assembly is mounted in, ie. applied to the stator stack 1, which can be noticed to be also provided with the slots 9 intended to accomodate the wire coils.

Figure 2:
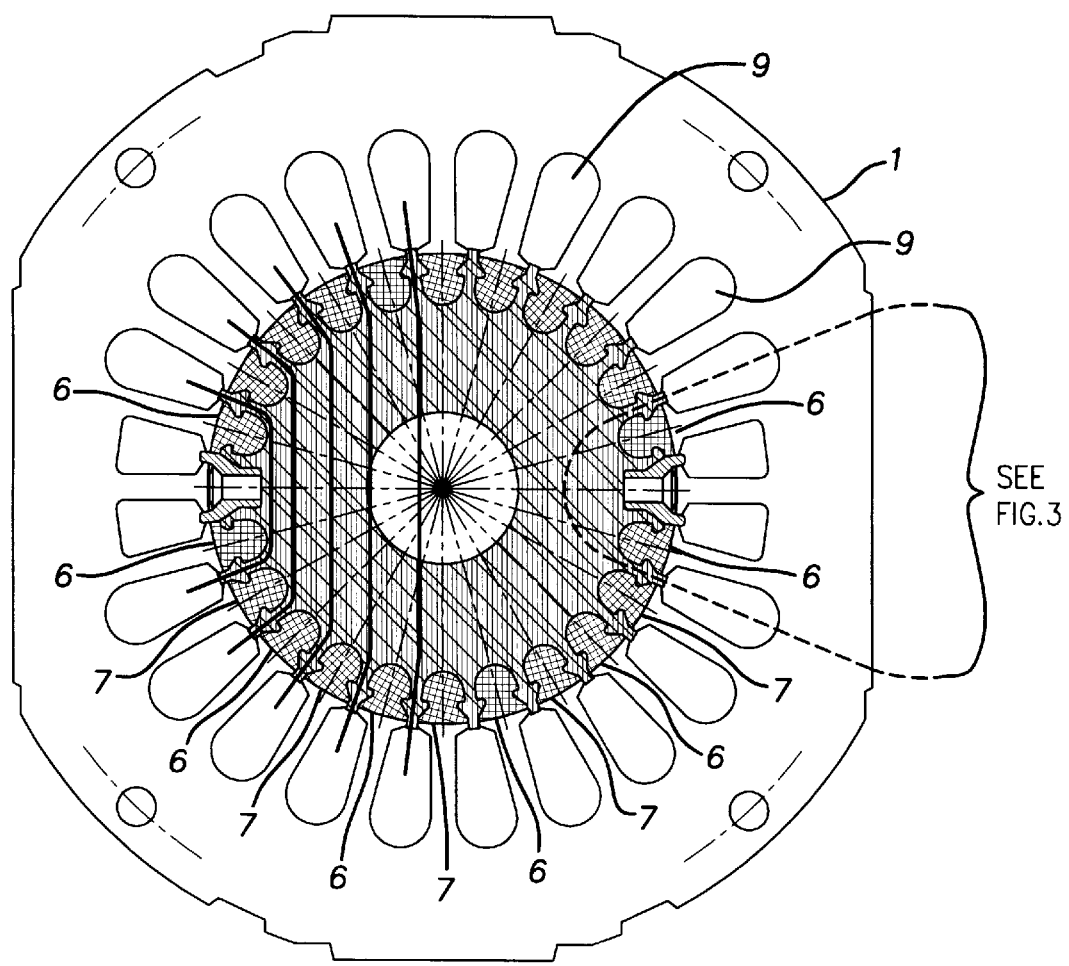
FIG. 2 is a horizontal-section view of the stator stack as coupled with the container of stationary wire-guide blades, as well as with the moving insertion spider, said sectional view being taken at the height of the blade stack guide.
Figure 4:
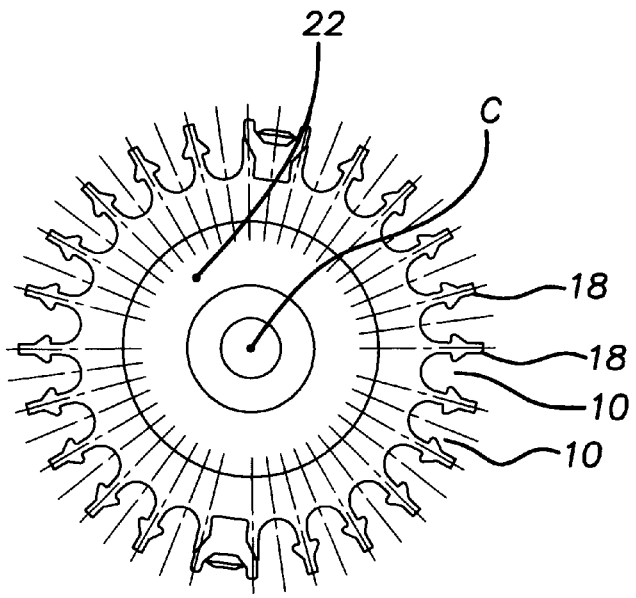
FIG. 4 is a horizontal-section view of the blade stack guide.
Figure 5:
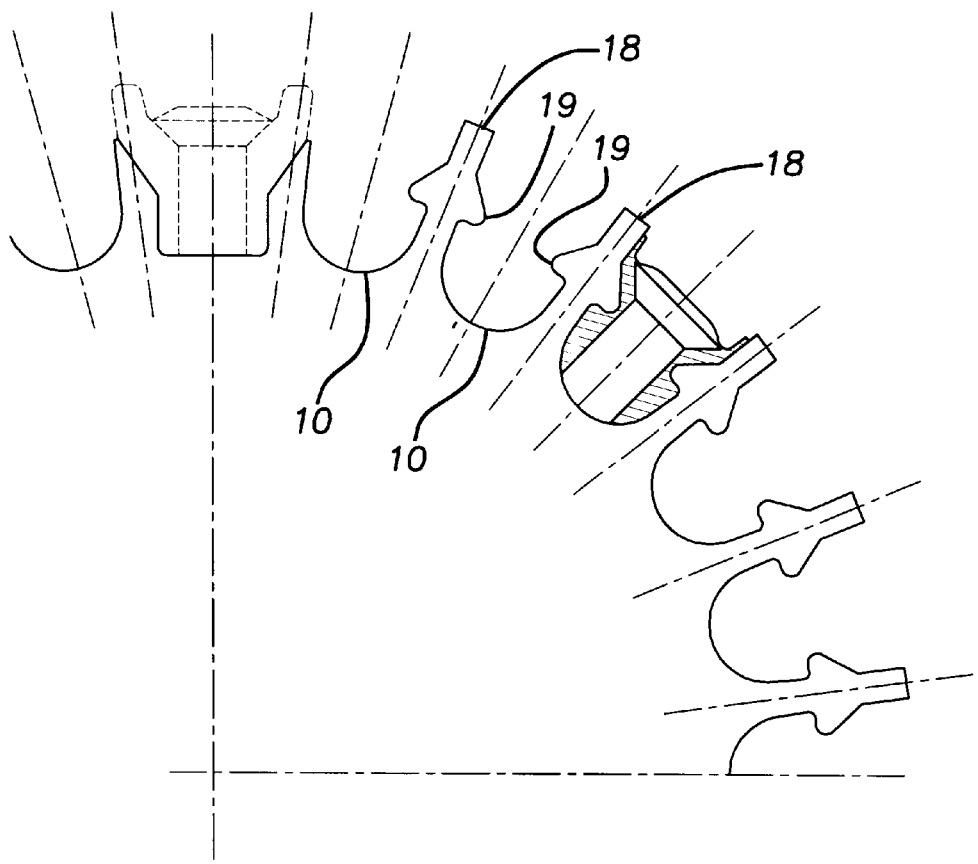
FIG. 5 is an enlarged horizontal-section view of a portion of the sole blade stack guide.

With reference to FIG. 2, the stationary blades 6 and the moving blades 7 can be noticed to be arranged according to an alternate scheme with respect to each other along a circular perimeter, and they are adapted to fit into respective parallel recesses 10 provided in a crown-like arrangement on the outside of the blade guide stack, the central body 22 of which is illustrated individually in FIGS. 4 and 5.

Figure 3:
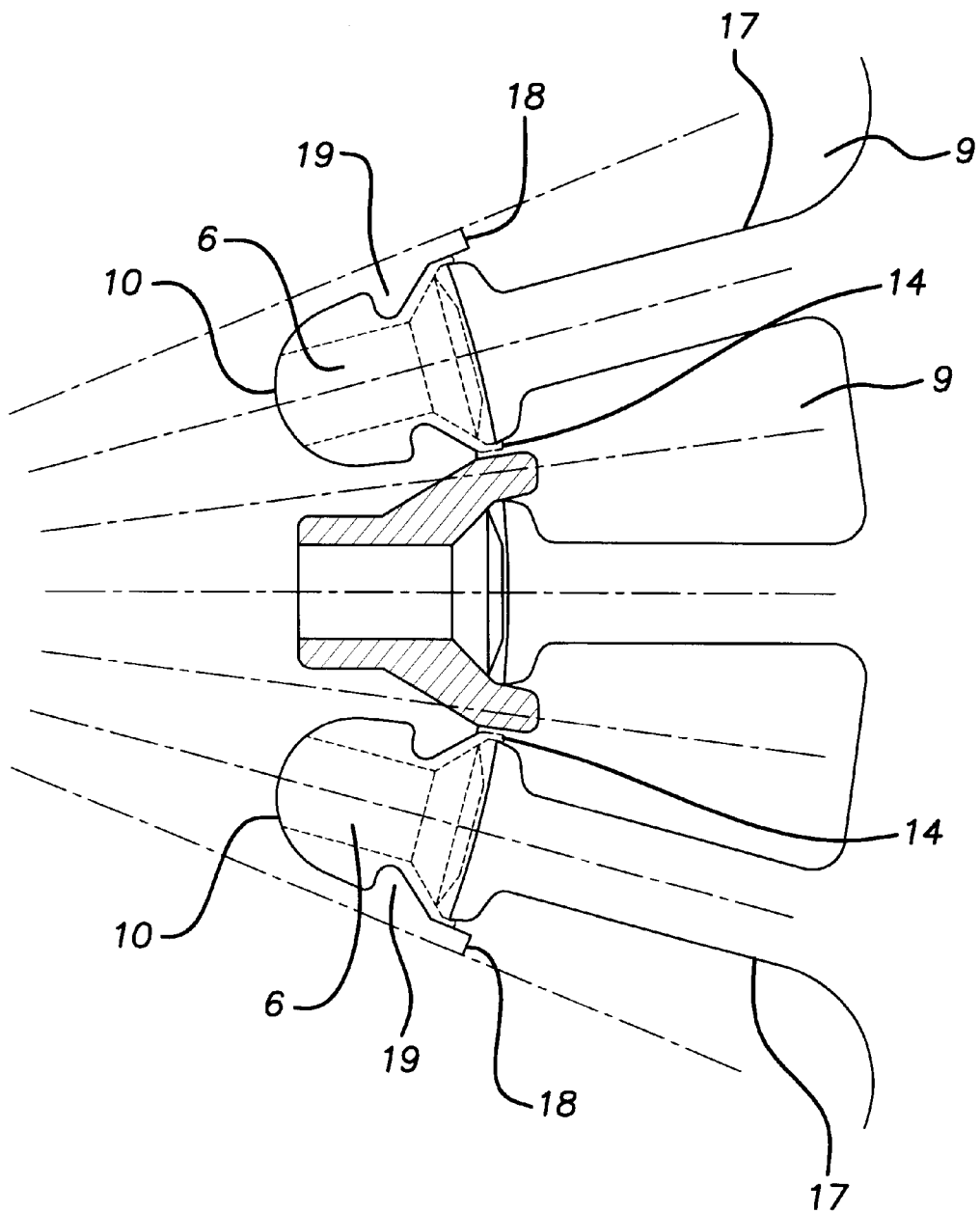
FIG. 3 is an enlarged view of a position of the preceding Figure.

Furthermore, FIG. 3 can be noticed to also illustrate in a clearly distinguishable manner the so-called "slot lining protection border" 14 provided in pairs laterally on each blade, be it stationary or moving, which protrudes from the outer side edges of each blade and fits in between the slot insulation 17 inside the slot 9 and the radial portions 18 of said blade stack guide that delimitate the adjacent recesses on the opposite sides.

In order to prevent the blades from flexing outwardly, which is the actual drawback to be eliminated, the present invention teaches to create a sort of "anchorage", which must however be capable of sliding to accompany the motion of the blade stack guide, between said stationary and moving blades 6 and 7 and the corresponding recesses 10 provided in a crown-like arrangement along the outer perimeter of the cylindrical body of the blade stack guide 4.

Such an anchorage is created by both a particular shape or configuration of the hollow, ie. inner surface of said recesses and a corresponding shape or configuration of the outer surface of each single blade, so that these elements are capable of engaging each other and, owing to the blade stack guide being a solid and rigid cylinder, it ensues that both the stationary and moving blades by engaging, albeit slidably, the respective recesses of said blade stack guide, are totally prevented from flexing and twisting, thereby reaching the desired aim.

Such an anchorage may of course be also obtained by only creating an interference between recess and blade so that the latter cannot be pulled out of the former, said interference being able to be quite easily obtained by letting the concerned elements engage each other in an "undercut"-like manner with respect to the radial direction of the central axis of the blade stack guide, which coincides with the axis "C" of the moving spider.

Various forms and manners are of course possible in view of implementing such a slidable "anchorage" between recesses and blades, using either just a single anchorage element or even more elements.

A preferred solution is as illustrated in the Figures, in which said "slidable anchorage" is brought about exactly by means of said radial portions 18. In fact, these are provided, preferably in pairs and on the opposite sides thereof, ie. with respect to two adjacent recesses, with ribs 19 protruding into the corresponding recess of the blade stack guide.

Figure 6:
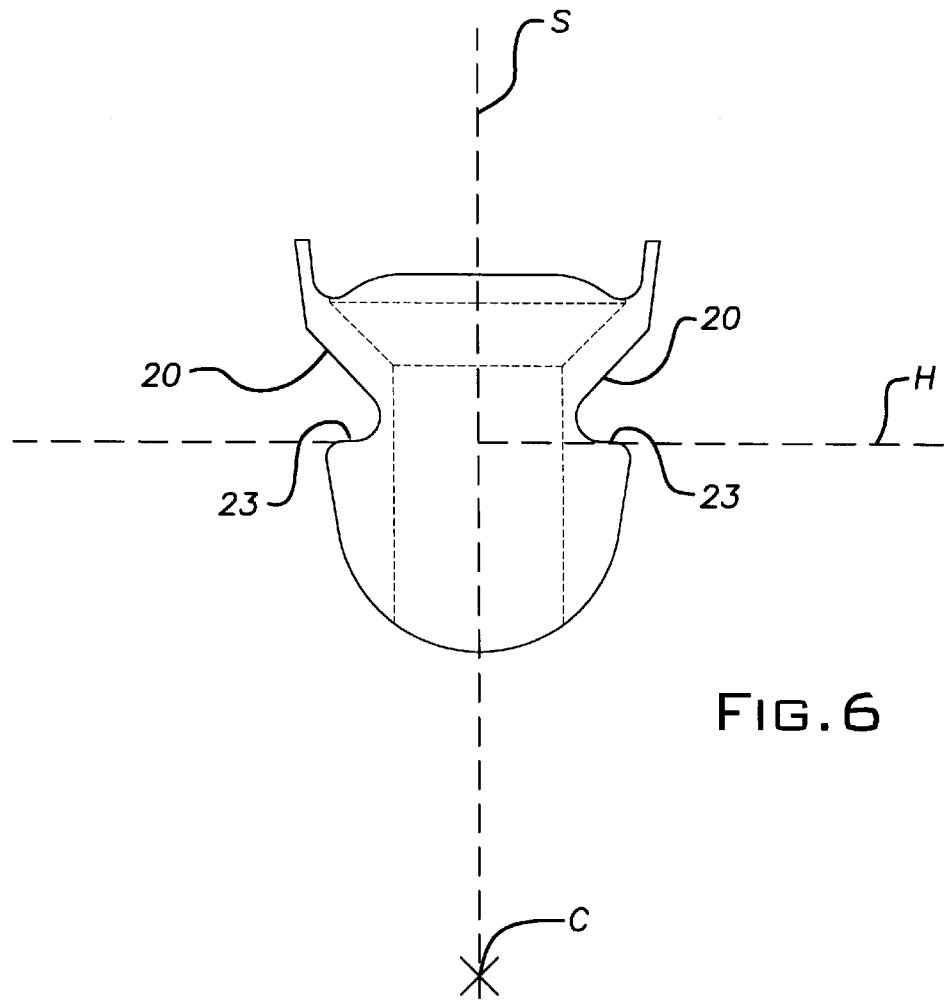
FIG. 6 is a cross-sectional view of a typical, both stationary and moving blade according to the present invention.
Figure 7:
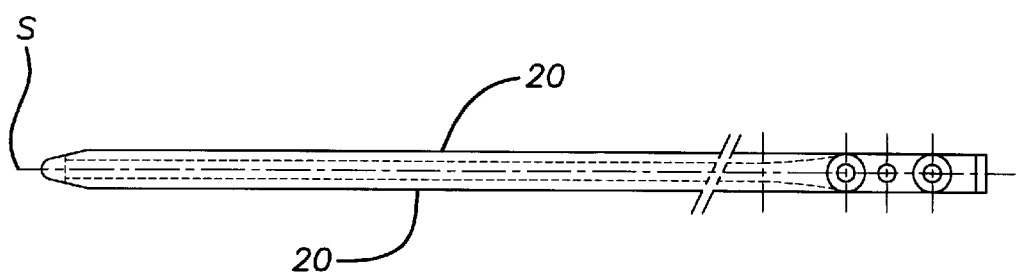
FIG. 7 is a front view of a blade according to the present invention.

For them to fit the desired purpose, said ribs 19 must be able to engage appropriate corresponding grooves 20 provided on the sides of both stationary and moving blades (FIG. 6). In an advantageous manner, in view of an improved manufacturability, interchangeability and assemblability of said blades, the respective grooves are arranged in pairs symmetrically with respect to a vertical midplane "S" passing through the central axis "C" of the moving spider.

Figure 3A:
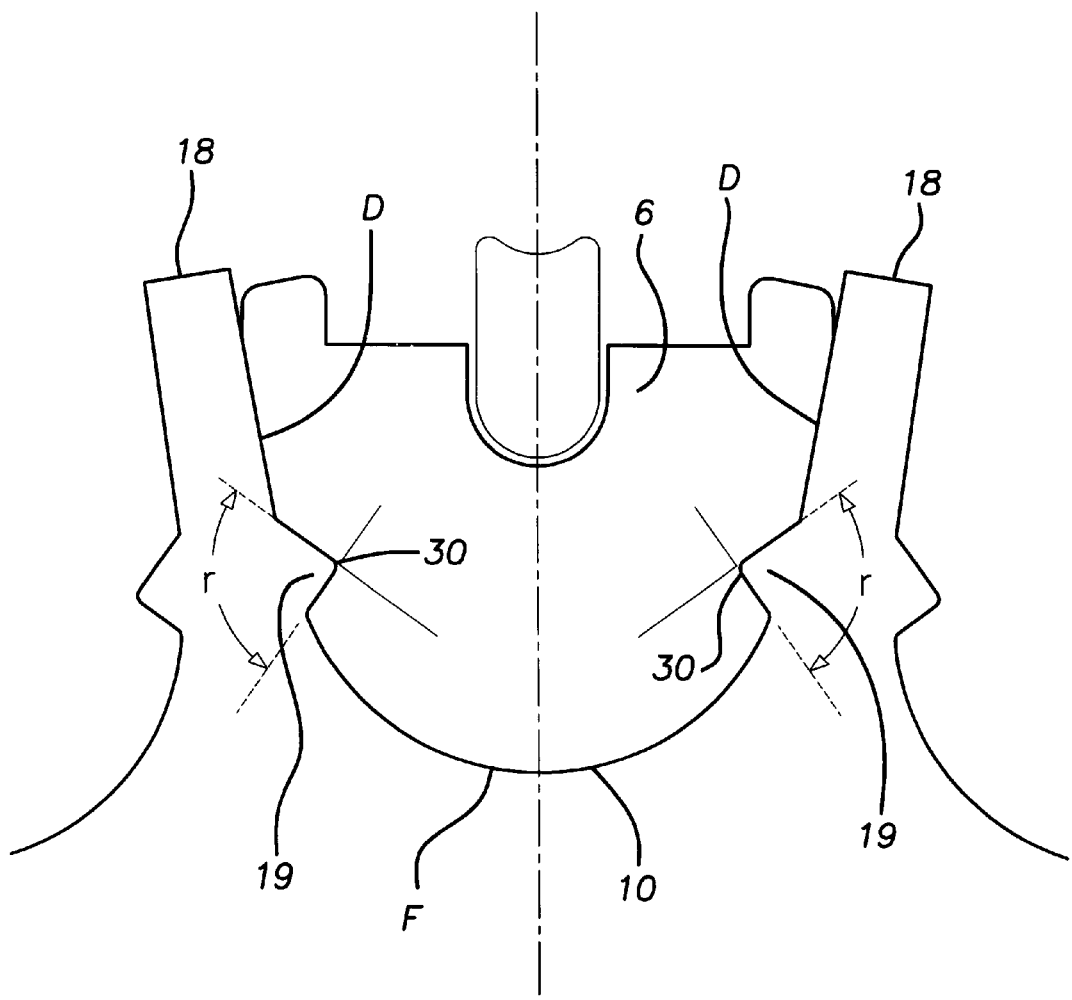
FIG. 3A is a view of a variant in the shape of the blades and the recesses of the blade stack guide with respect to the solution illustrated in FIG. 3.

It has been corroborated experimentally that, for the blades to be impaired an adequate effect of resistance to both outwardly and inwardly directed flexural stresses, as well as to torsional stresses, said grooves and respective ribs must be provided, ie. arranged in correspondence of the transition zone between the straight profile "D", facing the exterior of the recess, and the curved profile "F" situated in the inner part thereof, as illustrated in FIG. 3A.

Said grooves 19 must furthermore be provided with a triangular contour, and the corners 30 that are due to fit into the respective blade must have an angle "r" of at least 60°.

However, if it is in particular the resistance of the blades to outwardly directed flexural stresses that has to be reached on a priority basis, it is an advantageous solution if, with reference to FIGS. 3 and 6, said grooves 20 and said ribs 19, which are so mutually engaged in pairs inside the same recess, are provided with at least a surface 23 of mutual resistance that must be plane and oriented orthogonally (H) to the midplane "S" of the respective recess, so as to bring about a kind of engagement by mutual frontal opposition of the respective ribs and grooves.

Finally, considering that the moving spider, when used or existing in the arrangement, must be able to slide jointly with the respective moving blades within the crwon-like arrangement of stationary blades, and that the central body of this moving spider is provided with appropriate external recesses adapted to accomodate respective vertically sliding stationary blades, it is of particular advantage if also said external recesses existing in said central body of the moving spider are provided with similar engagement ribs as the ones existing in the blade stack guide, since when the moving spider is raised to insert the wire coils, said central body of the moving spider is in this way able to maintain the stationary blades, within which it is sliding, in their correct position, while in particular preventing them from being forced into flexing outwardly.

It will be appreciated that the description and illustrations set forth above with reference to the accompanying drawings have been given merely as a non-limiting exemplification of the invention, and that any of a number of further variants and modifications can therefore be devised and introduced without departing from the scope of the present invention.

What is claimed is:

1. An arrangement for insertion of coil in a stator stacks said arrangement comprising:

a container (2) supporting a plurality of stationary wire-guide blades (6) arranged along a contour thereof, a moving wire-insertion spider (3) having a central axis (C) and supporting a plurality of moving wire-guide blades (7) such that said stationary blades and moving blades are parallel, said moving spider being slidable with respect to said container (2), wherein said stationary wire-guide blades and said moving wire-guide blades are each provided, at least partially, with a groove (20) extending in the outer surface of the blade in a direction that is parallel to a length direction of said blade, wherein said spider comprises a blade stack guide member provided with a rigid substantially cylindrical body (22) having a plurality of parallel recesses (10) adapted to accommodate respective stationary and moving blades wherein said recesses (10) are each provided with a respective rib (19) extending parallel to a length direction of the respective recesses, said ribs face an interior of the respective recesses and are adapted to engage said grooves (20) when said blade stack guide is inserted into said wire-guide blades (6, 7), wherein said stationary wire-guide blades and said moving wire-guide blades and respective recesses are provided with a straight profile (D) facing the exterior of the recess and a curved profile (F) situated in the internal part of the recess, and that said grooves and respective ribs (19) are arranged in the transition 7 one between said straight profile (D) and said curved profile (F), and wherein said ribs (19) have a triangular shape with edges being angularly separated by more than 60°.

2. The arrangement according to claim 1 wherein at least a contact surface (23) between said grooves and said ribs is plane and oriented orthogonally (H) to a radius of said spider passing through said central axis and the respective groove.

3. An arrangement for the insertion of coils in a stator stack, said arrangement comprising:

a container (2) supporting a plurality of stationary wire-guide blades (6) arranged along a contour thereof, a moving wire-insertion spider (3) having a central axis (C) and supporting a plurality of moving wire-guide blades (7) such that said stationary blades and moving blades are parallel, said moving spider being slidable with respect to said container (2), wherein said stationary wire-guide blades and, said moving wire-guide blades are each provided, at least partially, with a groove (20) extending in the outer surface of the blade in a direction that is parallel to a length direction of said blade, wherein said spider comprises a blade stack guide member provided with a rigid substantially cylindrical body (22) having a plurality of parallel recesses (10) adapted to accommodate respective stationary and moving blades, wherein said recesses (10) are each provided with a respective rib (19) extending parallel to a length direction of the respective recesses, said ribs face an interior of the respective recesses and are adapted to engage said grooves (20) when said blade stack guide is inserted into said wire-guide blades (6, 7), wherein said grooves (20) are arranged in pairs on said stationary wire-guide blades and said moving wire-guide blades and are symmetrical with respect to a respective vertical midplane (S) passing through said central axis (C) of said moving spider, and wherein at least a contact surface (23) between said grooves and said ribs is plane and oriented orthogonally (H) to a radius of said spider passing through said central axis and the respective groove.

4. An arrangement for the insertion of coils in a stator stack, said arrangement comprising:

a container (2) supporting a plurality of stationary wire-guide blades (6) arranged along a contour thereof, a moving wire-insertion spider (3) having a central axis (C) and supporting a plurality of moving wire-guide blades (7) such that said stationary blades and moving blades are parallel, said moving spider being slidable with respect to said container (2), wherein said stationary wire-guide blades and said moving wire-guide blades are each provided, at least partially, with a groove (20) extending in the outer surface of the blade in a direction that is parallel to a length direction of said blade, wherein said spider comprises a blade stack guide member provided with a rigid substantially cylindrical body

(22) having a plurality of parallel recesses (10) adapted to accommodate respective stationary and moving blades, wherein said recesses (10) are each provided with a respective rib (19) extending parallel to a length direction of the respective recesses, said ribs face an interior of the respective recesses and are adapted to engage said grooves (20) when said blade stack guide is inserted into said wire-guide blades (6, 7), wherein said grooves (20) are arranged in pairs on said stationary wire-guide blades and said moving wire-guide blades and are symmetrical with respect to a respective vertical midplane (S) passing through said central axis (C) of said moving spider, wherein said recesses (10) are provided with respective pairs of said ribs (19) extending parallel to the axis of said blade stack guide and facing the interior of the respective recess, in which said pairs of ribs are adapted to engage respective pairs of said grooves (20) when said blade stack guide is inserted into said wire-guide blades (6, 7), and wherein at least a contact surface (23) between said grooves and said ribs is plane and oriented orthogonally (H) to a radius of said spider passing through said central axis and the respective groove.

5. An arrangement for the insertion of coils in a stator stack, said arrangement comprising:

a container (2) supporting a plurality of stationary wire-guide blades (6) arranged along a contour thereof, a moving wire-insertion spider (3) having a central axis (C) and supporting a plurality of moving wire-guide blades (7) such that said stationary blades and moving blades are parallel, said moving spider being slidable with respect to said container (2), wherein said stationary wire-guide blades and said moving wire-guide blades are each provided, at least partially, with a groove (20) extending in the outer surface of the blade in a direction that is parallel to a length direction of said blade, wherein said spider comprises a blade stack guide member provided with a rigid substantially cylindrical body (22) having a plurality of parallel recesses (10) adapted to accommodate respective stationary and moving blades, wherein said recesses (10) are each provided with a respective rib (19) extending parallel to a length direction of the respective recesses, said ribs face an interior of the respective recesses and are adapted to engage said grooves (20) when said blade stack guide is inserted into said wire-guide blades (6, 7), wherein said grooves (20) are arranged in pairs on said stationary wire-guide blades and said moving wire-guide blades and are symmetrical with respect to a respective vertical midplane (S) passing through said central axis (C) of said moving spider, wherein said recesses (10) are provided with respective pairs of ribs (19) extending parallel to the axis of said blade stack guide and facing the interior of the respective recess, in which said pairs of ribs are adapted to engage respective pairs of said grooves (20) when said blade stack guide is inserted into said wire-guide blades (6, 7), wherein said ribs and said grooves are oriented and sized so as to be capable of preventing said wire-guide blades (6, 7) from at least one of flexing and distorting when they are mutually engaged, and wherein at least a contact surface (23) between said grooves and said ribs is plane and oriented orthogonally (H) to a radius of said spider passing through said central axis and the respective groove.

6. The arrangement according to claim 1, said moving spider further comprises a central body, said central body providing respective external recesses adapted to accommodate respective vertically slidable stationary blades, and wherein said recesses are provided with ribs adapted to engage said grooves (20) of said stationary blades (6) so as to enable said stationary blades to be slidably associated to said central body of said moving spider.

7. The arrangement according to claim 2, said moving spider further comprises a central body, said central body providing respective external recesses adapted to accommodate respective vertically slidable stationary blades, and wherein said recesses are provided with ribs adapted to engage said grooves (20) of said stationary blades (6) so as to enable said stationary blades to be slidably associated to said central body of said moving spider.

* * * * *

UNITED STATES PATENT AND TRADEMARK OFFICE
CERTIFICATE OF CORRECTION

PATENT NO.    : 6,553,654 B1
DATED         : April 29, 2003
INVENTOR(S)   : Alonso It is certified that error appears in the above-identified patent and that said Letters Patent is hereby corrected as shown below:

<u>Title page,</u>
Item [57], ABSTRACT
Line 11, please delete "maybe", and insert therefor -- may be --.

<u>Column 1,</u>
Line 17, please delete "all", and insert therefor -- art --.

<u>Column 2,</u>
Line 30, please delete "se", and insert therefor -- sé --.
Line 31, please delete ",".

<u>Column 3,</u>
Line 58, after "as" please delete ",".

<u>Column 4,</u>
Line 42, please delete "blades", and insert therefor -- blades, --.

<u>Column 5,</u>
Line 48, please delete "stacks", and insert therefor -- stacks, --.

<u>Column 6,</u>
Line 12, please delete "7 one", and insert therefor -- zone --.
Line 16, please delete "1", and insert therefor -- 1, --.
Line 39, please delete "and,", and insert therefor -- and --.

Signed and Sealed this

Twenty-first Day of October, 2003

JAMES E. ROGAN
*Director of the United States Patent and Trademark Office*